United States Patent [19]

Yamada et al.

[11] Patent Number: 4,511,830
[45] Date of Patent: Apr. 16, 1985

[54] SERVO CONTROL APPARATUS

[75] Inventors: Yasuaki Yamada, Funabashi; Toshiaki Ozawa, Tokyo; Hiroatsu Kondo, Zushi, all of Japan

[73] Assignee: Canon Kabushiki Kaisha, Tokyo, Japan

[21] Appl. No.: 285,922

[22] Filed: Jul. 23, 1981

Related U.S. Application Data

[62] Division of Ser. No. 69,927, Aug. 27, 1979, Pat. No. 4,315,200.

[30] Foreign Application Priority Data

| Aug. 29, 1978 | [JP] | Japan | 53-105149 |
| Sep. 20, 1978 | [JP] | Japan | 53-115648 |
| Sep. 20, 1978 | [JP] | Japan | 53-115649 |
| Sep. 20, 1978 | [JP] | Japan | 53-156650 |
| Sep. 20, 1978 | [JP] | Japan | 53-115651 |

[51] Int. Cl.³ .............................................. H02P 5/00
[52] U.S. Cl. ................................... 318/318; 318/313; 318/464; 318/636; 318/257
[58] Field of Search ............... 318/318, 464, 636, 313, 318/314, 257

[56] References Cited

U.S. PATENT DOCUMENTS

| 3,654,479 | 4/1972 | Catherin | 318/314 X |
| 3,885,206 | 5/1975 | Hort | 318/314 |
| 4,061,950 | 12/1977 | Kayanuma | 318/314 |
| 4,085,577 | 4/1978 | Natori | 318/318 |
| 4,091,314 | 5/1978 | Johnson | 318/464 |
| 4,177,411 | 12/1979 | Takaoka | 318/318 X |
| 4,211,967 | 7/1980 | Akiyama et al. | 318/318 X |
| 4,216,419 | 8/1980 | van Dam | 318/314 X |
| 4,238,716 | 9/1978 | Redmond | 318/318 X |
| 4,240,014 | 12/1980 | Muller | 318/318 |
| 4,242,619 | 12/1980 | Nakamura | 318/318 X |

Primary Examiner—B. Dobeck
Attorney, Agent, or Firm—Fitzpatrick, Cella, Harper & Scinto

[57] ABSTRACT

A frequency-voltage converting system has a first sampler for sampling the input signal at a predetermined time interval, a second sampler for sampling the input signal after elapse of a predetermined time period from said predetermined sampling time, and comparator for comparing the sampled values obtained respectively from said first and second samplers and providing the difference of said sampled values as a value proportional to the frequency of said input signal.

14 Claims, 25 Drawing Figures

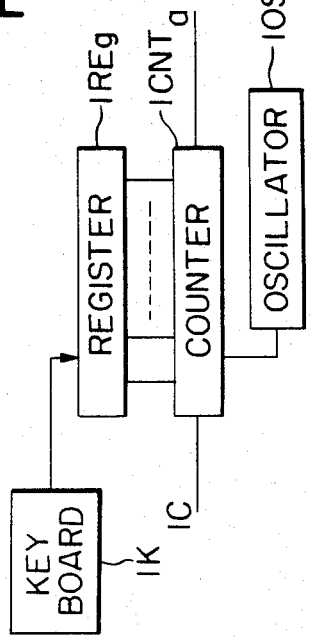
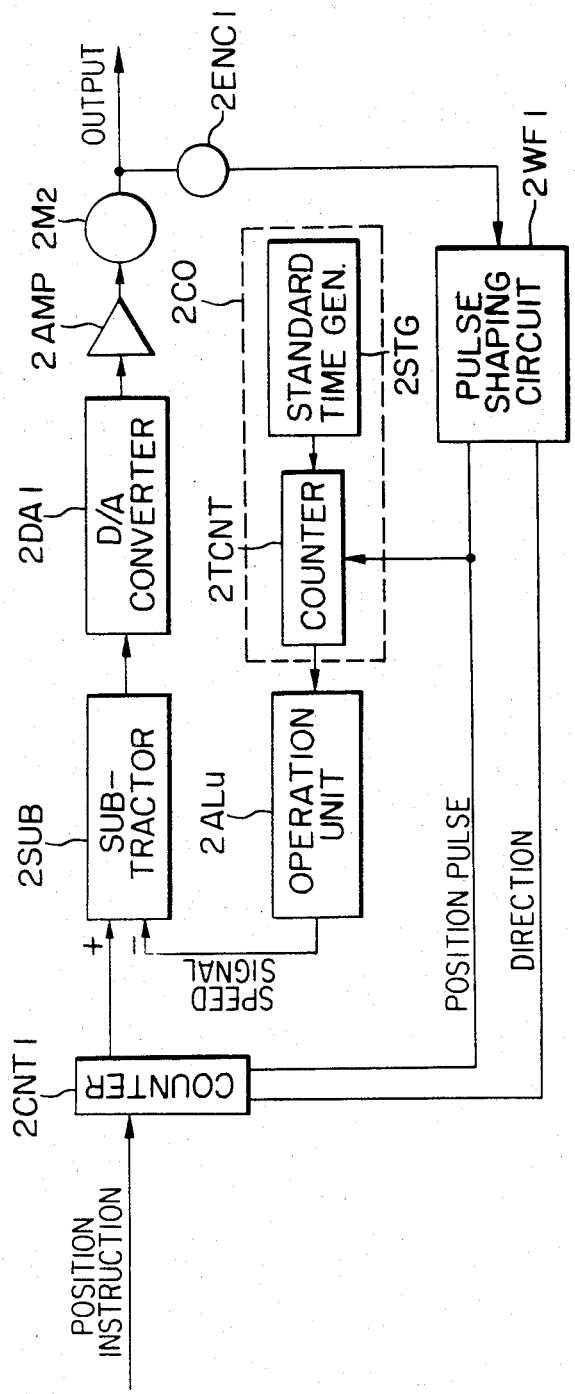
FIG. 14
FIG. 15

SERVO CONTROL APPARATUS

This is a division of application Ser. No. 69,927, filed Aug. 27, 1979, now U.S. Pat. No. 4,315,200.

BACKGROUND OF THE INVENTION

1. Field of the Invention

The present invention relates to a servo control system.

2. Description of the Prior Art

For the purpose of frequency-voltage conversion there is already known a circuit shown in FIG. 1, comprising a voltage comparator C, a mono-stable circuit M and a filter F.

Upon receipt of an AC signal as shown in FIG. 2(a) at the terminal TI, the above-mentioned circuit performs the wave-form conversion in said voltage comparator C to generate square-wave signals as shown in FIG. 2 which activates the mono-stable circuit M of which output is taken out through the filter F as an analog signal of a value corresponding to the frequency of the original signal supplied to the input terminal TI.

However, in order to obtain the signal from the output terminal TO, the frequency of the input signal has to be at least several cycles.

Also in the conventional servo control system in which the pulse signals obtained from a position detector are supplied to a low-pass filter to obtain a voltage corresponding of the speed, the output signal cannot be obtained unless at least several pulses are supplied, whereby the control being associated with a delay, thus leading to the unstable function of the system. Also when the servo motor is stopped, a false speed signal may be generated by the eventual vibration.

Besides in the conventional servo control the adjustment of the amount of speed component is conducted by the variation of the amplifying ratio of the amplifier. Thus it has been necessary to have the amplifiers or different amplifying ratios corresponding to the number of different loads and to select appropriate amplifier for example by a switch in response to the change of the load.

Furthermore, conventional servo control systems principally rely on the analog operational amplifier. For example in a conventional position servo control system shown in FIG. 3, a position signal obtained as a voltage from a potentiometer PM and a speed signal obtained from a speed generator SG are supplied, as error signals against the position instruction signal, to an operational amplifier OP for controlling a drive source M. The use of such operational amplifier has resulted in the fluctuation in the stopping position of the drive source or in the speed thereof, due to the temperature characteristics of the amplifier or the fluctuation in the power supply voltage.

Also in a servo control system wherein the drive source is controlled by an increment type encoder ENC for detecting the state of the drive source M1 as shown in FIG. 4, an operational amplifier OP2 is still used for processing the position signal which is obtained by the counting in a counter CNT of the position pulses supplied from an encoder ENC through a wave forming circuit WF followed by a digital-analog conversion in a converter DA and the speed signal obtained by a frequency-voltage conversion of said position pulses by a converter FV. Consequently the dependence on the temperature characteristics or on the fluctuation of power supply voltage is essentially same as in the above-explained case.

Furthermore, in the conventional servo control systems the speed change can be achieved in two methods. One is the conventional constant-speed servo control system shown in FIG. 5, wherein the increment type encoder ENC1 used as the speed detector generates a pulse for each displacement of a determined distance, thus providing a pulse train of a frequency corresponding to the displacing speed. Said frequency is converted by a frequency-voltage converter fV into a voltage, and the difference voltage from the instructed speed obtained in a subtractor SUB is amplified in an amplifier AMP and supplied to a drive source M2. The change of speed is achieved by the change of the instruction speed. On the other hand the variable-speed servo control is often employed as a part of the constant-position servo control, since the latter alone is frequently unable to cover the entire range due to the saturation phenomenon of the amplifier or the power supply voltage. Thus the control is effected by the constant-speed servo system while the positional error (distance to the target position) is large, and is changed to the constant-position servo system at a position close to the target. In such case there is employed a variable-speed servo control in which the instruction speed is decreased according to the value of positional error toward the target position. The other method of speed change is represented by the constant-speed servo control containing the variable-speed servo control shown in FIG. 6, wherein a switch SW makes a circuit a-c when the content of a counter CNT representing the positional error is large whereby the position-speed converting circuit PV constitutes a constant-speed servo system, thus providing instruction speeds corresponding to the positional error as shown in FIG. 7. When the positional error becomes small the switch SW makes a circuit b-c to provide a constant-position servo control. In this system, however, if the amplifier AMP1 is so designed as not to be saturated even for an extremely large positional error (G in FIG. 7), the power supplied to the drive source becomes very small in the constant-speed servo range just outside the constant position servo range (A in FIG. 7), leading to a slow start from stationary state, i.e. a longer time required to reach the instruction speed. This drawback is extremely disadvantageous for input/output apparatus for computer for which rapid start and stop are required.

Furthermore the speed generator utilized as the speed detector for example for the control of servo motor is expensive and bulky though it is capable of providing a voltage of different polarities according to the direction of rotation.

On the other hand an optical encoder can also be utilized as the speed detector as shown in FIG. 8. In this circuit the encoder ENC3 provides two signals of different phases, and the moving direction is identified by a direction detector WD from the delay between said two signals. The speed signal with direction is obtained by selecting, by means of a switch SW1 controlled by said signal of moving direction, the signal obtained by frequency-voltage conversion in a converting circuit FV3 of the output from the encoder ENC3 or the inverted signal obtained through an inverter I.

Thus, in the use of the optical encoder, it becomes necessary to effect frequency-voltage conversion and to invert the polarity of the output thereof according to the moving direction. Also the frequency-voltage converting circuit, designed to average the pulse intervals, is unable to provide instantaneous speed, thus causing delay or providing a false speed information.

Thus the above-explained circuit, if applied for example to the control of a servo motor, will lead to an extremely unstable function thereof.

SUMMARY OF THE INVENTION

The object of the present invention is to provide a frequency-voltage converting system with improved frequency-voltage conversion.

Another object of the present invention is to provide a novel servo control system which is not associated with the above-mentioned drawbacks.

Still another object of the present invention is to provide a servo control system allowing secure and stable function of the servo control circuit.

Still another object of the present invention is to provide a servo control system allowing change of feedback value with a simple circuit structure.

Still another object of the present invention is to provide a servo control system allowing easy control with a digital circuit.

Still another object of the present invention is to provide a speed servo control system conducting speed control by variable frequency division of a pulse train obtained as the detection signal from the drive source.

Still another object of the present invention is to provide a speed detection system capable of obtaining an instantaneous speed signal of positive or negative polarity corresponding to the moving direction directly from the detection signal of a moving body.

Still another object of the present invention is to provide a frequency-voltage converting system providing a voltage corresponding to the frequency from the difference between the value of input signal at a predetermined time and that at a predetermined period after said time.

Still another object of the present invention is to provide a servo control system comprising means for providing an AC signal representing the displacement of a moving body and means for obtaining the difference between the value of said AC signal at a predetermined time and the value of said AC signal at a predetermined period after said time, and obtaining the output of the latter means as the speed component of the servo motor.

Still another object of the present invention is to provide a servo control system comprising means for providing pulse train of a frequency proportional to the speed, means for measuring the interval of said pulses and means for providing the reciprocal of said interval and providing said reciprocal as the speed component.

Still another object of the present invention is to provide a speed detection system comprising means for providing a signal of a frequency proportional to the speed of a moving body, means for providing the difference between the value of said signal at a predetermined time and the value of said signal at a predetermined period after said time, means for detecting the moving direction of said moving body and means for determining the polarity of said difference according to the output of said detecting means.

Still another object of the present invention is to provide a speed servo control system comprising signal generating means for providing pulse train of a frequency proportional to the speed, frequency dividing means for frequency dividing said pulse train, and means for changing the frequency dividing ratio of said frequency dividing means, and conducting the speed control by changing the frequency dividing ratio of said frequency dividing means by said changing means and comparing thus divided frequency with a predetermined standard frequency.

BRIEF DESCRIPTION OF THE DRAWINGS

FIG. 14 is a diagram of a control circuit;

FIG. 15 is a block diagram showing another embodiment of the servo control system of the present invention;

DESCRIPTION OF THE PREFERRED EMBODIMENTS

The frequency-voltage converting system of the present invention will now be clarified in detail by the following explanation taken in conjunction with the attached drawings.

Figure 9:
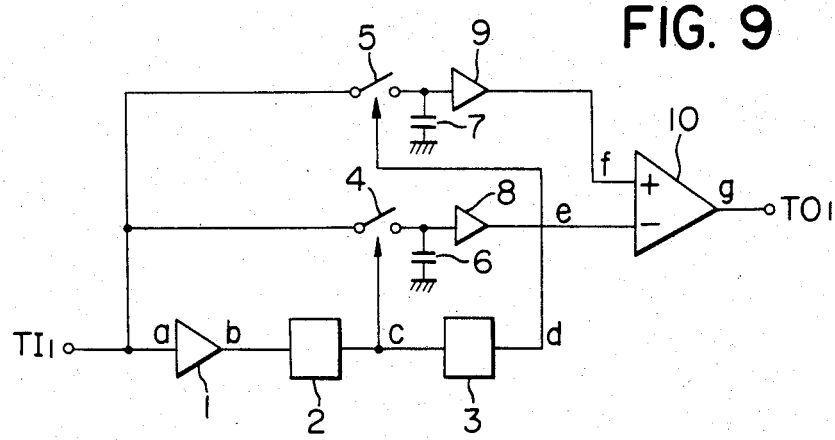
FIG. 9 is a block diagram of the frequency-voltage converting system of the present invention.

Reference is now made to FIG. 9 showing a block diagram embodying the frequency-voltage converting system of the present invention, in which:

1 is a saturation amplifier for wave forming the signal supplied to an input terminal Tl1;

2 is a pulse generator for generating a pulse at the leading end of the output signal from said saturation amplifier 1;

3 is a delay circuit for delaying the pulse signal from the pulse generator 2;

4, 5 are switches controlled by the output signals from said pulse generator 2 and delay circuit 3;

6, 7 are condensers for accumulating the signal supplied to the terminal TI1 when the switches 4, 5 are closed;

8, 9 are operational amplifiers for amplifying the signals stored in said condensers 6, 7 and supplying the outputs respectively to the input terminals +, − of a differential amplifier 10, whereby sample hold circuits being formed of 5, 7 and 9 and of 4, 6 and 8, and said differential amplifier 10 providing from an output terminal TO1 an analog voltage corresponding to the frequency of the signal supplied to the terminal TI1.

Figure 10:
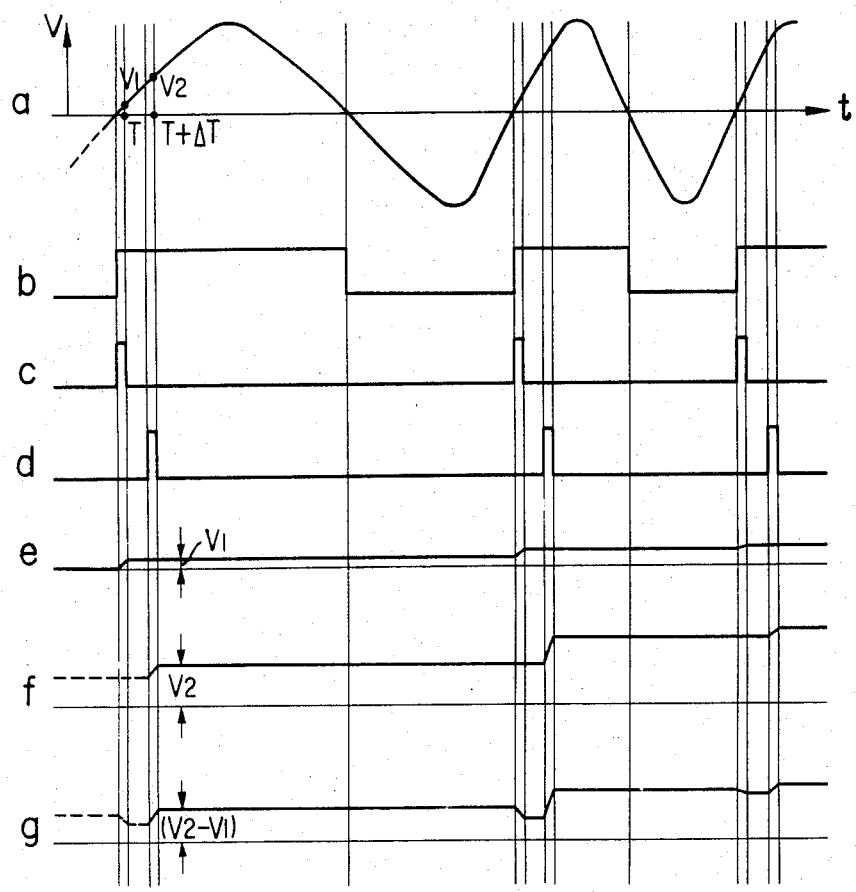
FIG. 10 is a wave-form chart.

In the following, explained in connection with the wave-form chart shown in FIG. 10, is the function of the embodiment of the above-explained structure, wherein the frequency is obtained from the slope of the input AC signal at the zero level.

Figure 1:
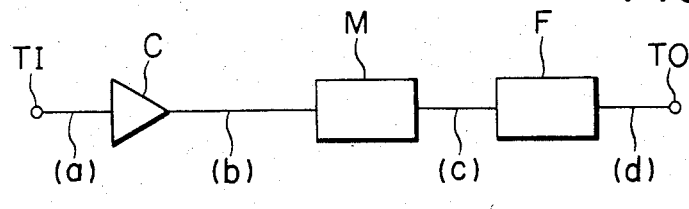
FIG. 1 is a chart showing the principle of a conventional frequency-voltage converting system.
Figure 2:
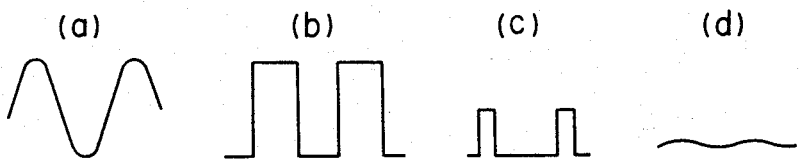
FIG. 2 is a wave-form chart.
Figure 3:
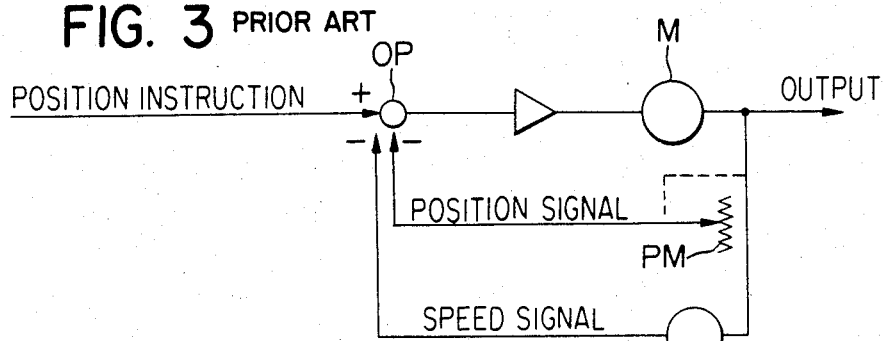
FIG. 3 is a block diagram of a conventional servo control system.
Figure 4:
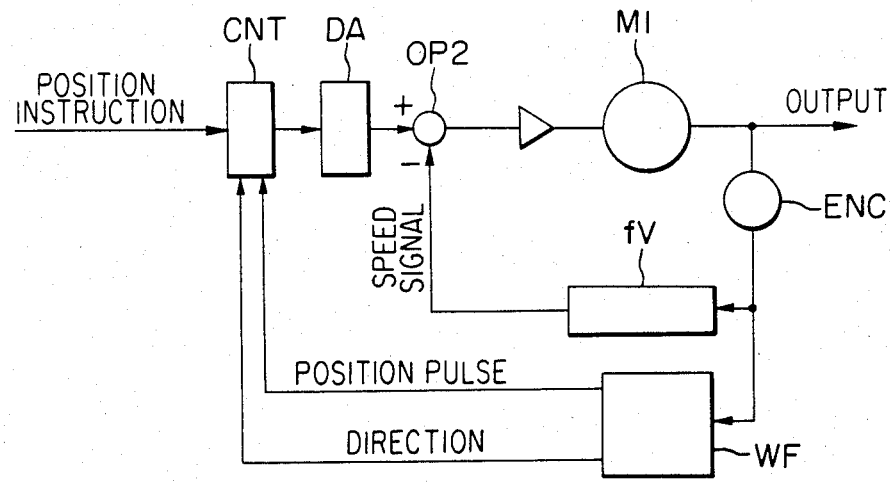
FIG. 4 is a block diagram of another conventional servo control system.
Figure 5:
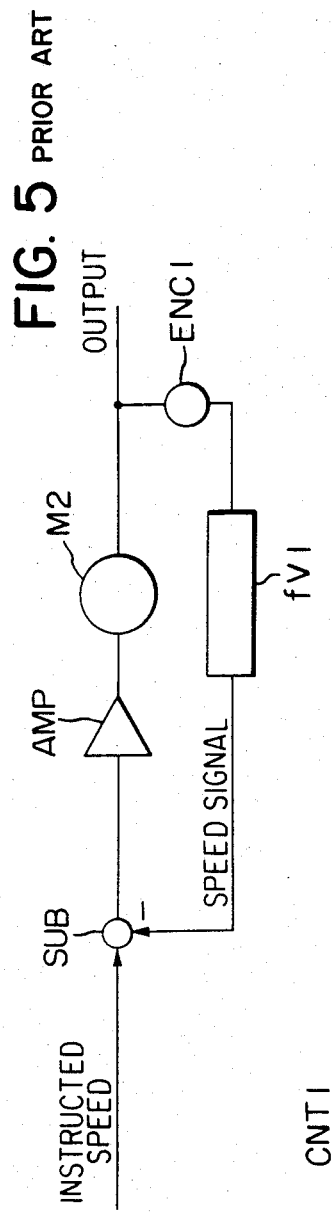
FIG. 5 is a block diagram of a conventional constant-speed servo control system.
Figure 6:
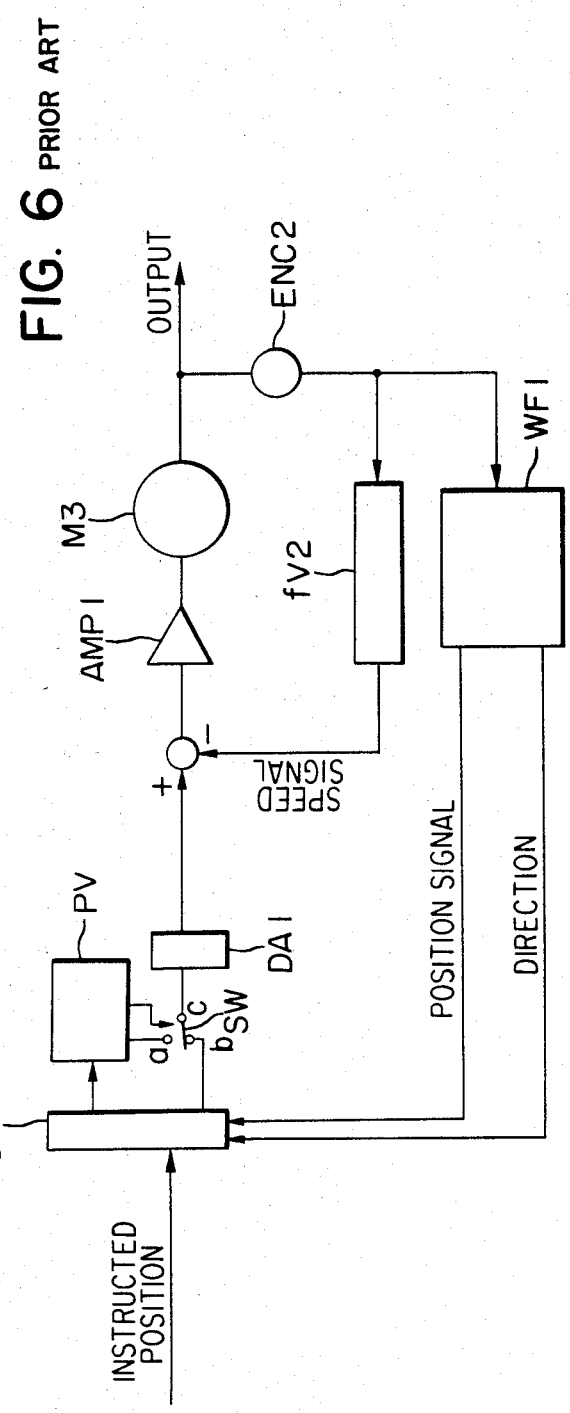
FIG. 6 is a block diagram of a constant-position servo control system containing a conventional variable-speed servo system responding to the positional error.
Figure 7:
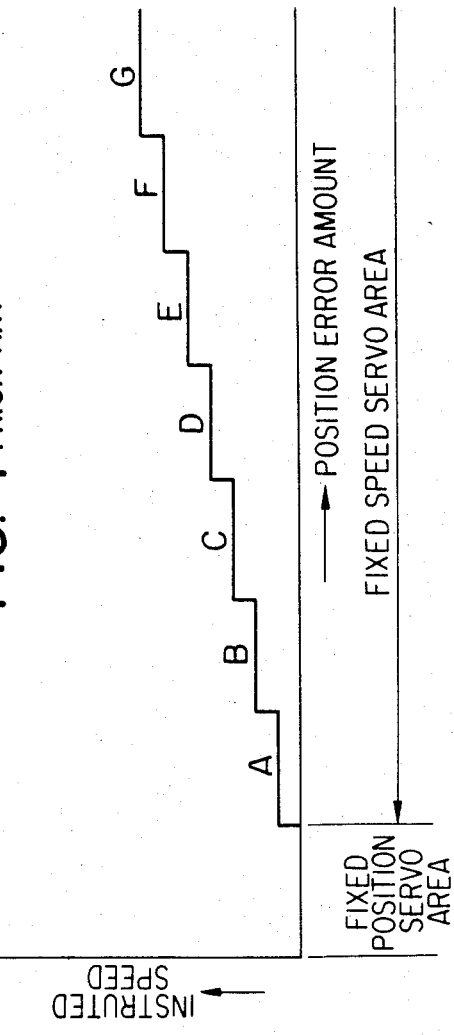
FIG. 7 is a chart showing the change in speed in response to the positional error in the system of FIG. 6.
Figure 8:
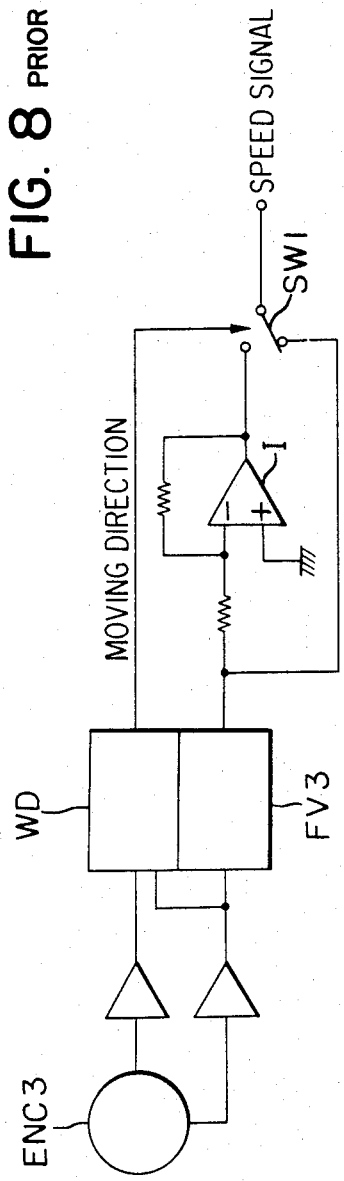
FIG. 8 is a block diagram of a conventional speed detecting system.

In response to the AC signal shown in FIG. 10a received at the terminal TI1 shown in FIG. 7, the saturation amplifier 1 starts to release an output signal at the time of zero level of said input AC signal as shown in FIG. 10b, whereby the pulse generating circuit 2 simultaneously releases a pulse as shown in FIG. 10c which closes the switch 4 at time T to store the input AC signal in the condenser 6. Said switch 4 is closed only during the continuation of the pulse, whereby the signal is memorized in the condenser 6.

Said pulse from the pulse generator 2 also closes the switch 5 after a period predetermined by the delay circuit 3, whereby the input AC signal after said period $\Delta T$ is stored in the condenser 7.

The signals thus stored in the condensers 6, 7 are amplified in the operational amplifiers 8, 9 and supplied to the differential amplifier 10. In FIG. 10, e and f are the outputs of the operational amplifiers 8, 9 respectively, corresponding to the input AC signals V1, V2, while g is the difference signal (f−e) obtained from the differential amplifier 10.

Said difference signal is proportional to the frequency as will be explained later, and in this manner it is rendered possible to obtain a voltage proportional to the frequency of the input AC signal.

The signal obtained at the terminal TO1 of the differential amplifier 10 can be expressed as follows:

$$g = a \sin w (T + \Delta T) - a \sin wT$$
$$= a (\sin wT \cos w\Delta T + \cos wT \sin w\Delta T - \sin wT)$$
$$= a\{\sin wT(\cos w\Delta T - 1) + \cos wT \sin w\Delta T\}$$

wherein the input signal is expressed by a sinusoidal wave $a \sin wT$, T is the duration of the pulse from the pulse generator 2, and $\Delta T$ is the delay time of the delay circuit 3.

The above equation can be approximated as follows since the first term is sufficiently smaller than the second term in the condition $wT \simeq 2n\pi$ and $T \simeq 0$:

$$g \simeq a \cos wT \sin w\Delta T$$

$$\simeq a \, w\Delta T$$

Thus g is approximately proportional to the frequency of the input AC signal.

The structure and function of an embodiment of the present invention is explained in the foregoing, but a more precise frequency-voltage conversion can be obtained if the pulse generator 2 is designed to generate a pulse also at the trailing end of the output signal from the saturation amplifier 1 thereby conducting a similar procedure on the inverted half-cycle of the input signal.

As explained in the foregoing, the frequency-voltage converting system of the present invention is capable of providing a voltage corresponding to the frequency with an extremely rapid response.

Figure 11:
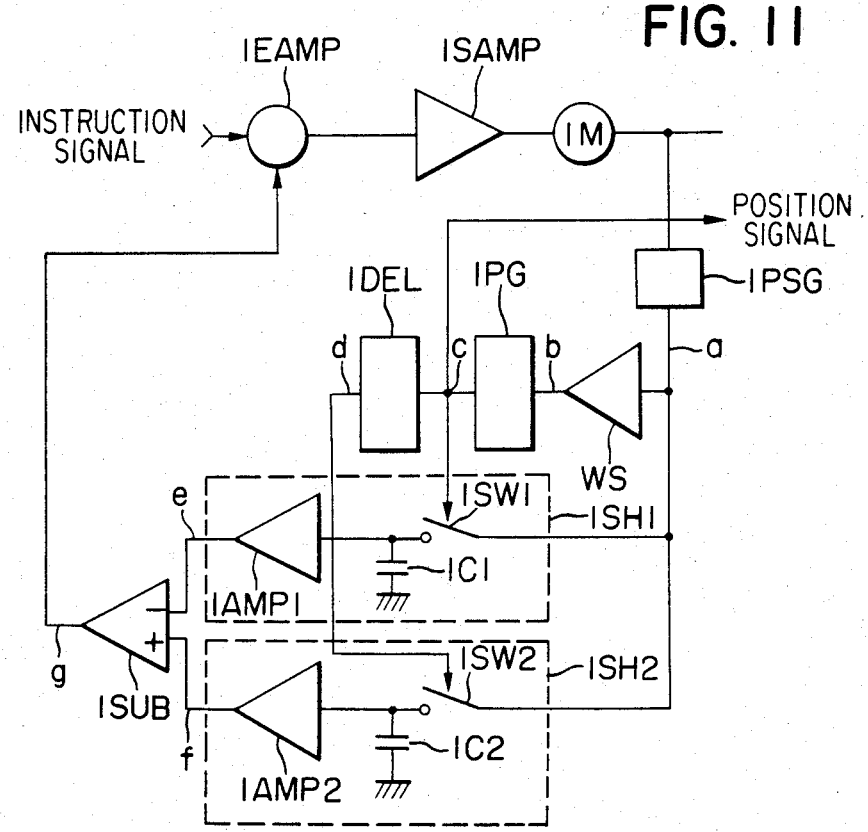
FIG. 11 is a block diagram embodying the servo control system of the present invention.
Figure 12:
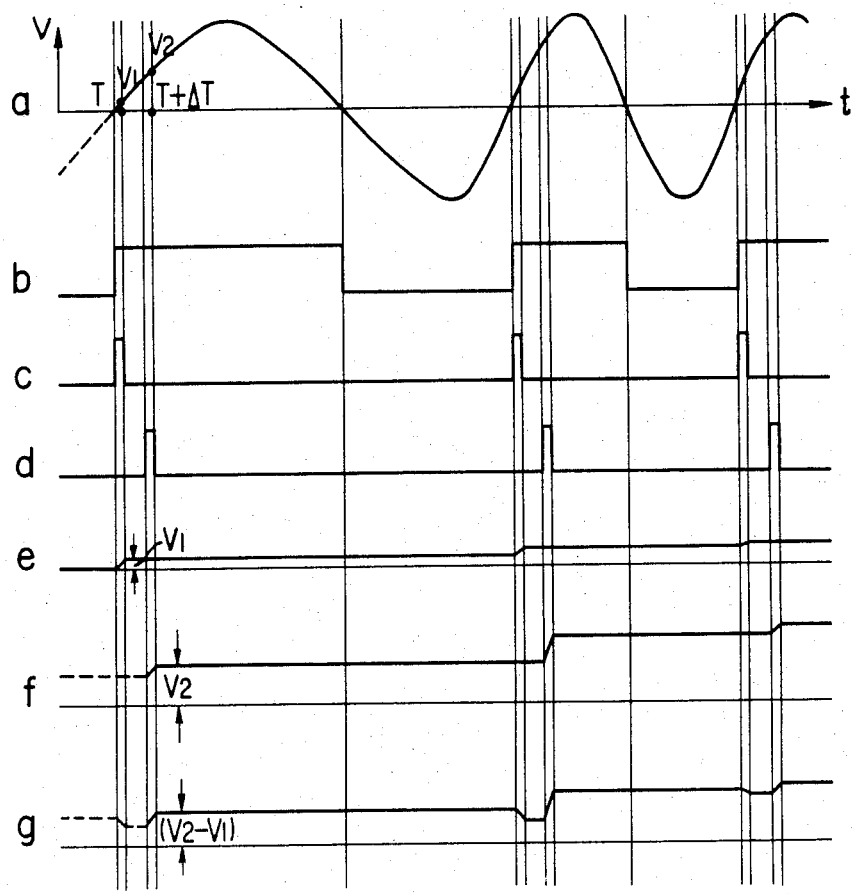
FIG. 12 is a wave-form chart.

Now there will be explained another embodiment of the servo control system of the present invention shown as a block diagram in FIG. 11, wherein:

1EAMP is an error amplifier for providing the difference between the instruction signal and the feedback signal;

1SAMP is a servo amplifier for amplifying the output of said error amplifier 1EAMP for driving a motor 1M;

1PSG is an increment type encoder provided on said motor 1M to provide an electric signal of a form shown in FIG. 12a according to the revolution of said motor;

1WS is a voltage comparator for providing a signal "1" or "0" for a voltage respectively higher or lower than the standard voltage, which is taken as zero in this case;

1PG is a pulse generator for providing a signal of a predetermined duration at the leading end of the output from the voltage comparator;

1DEL is a delay circuit for delaying the output of the pulse generator 1PG for a predetermined period;

1SH1, 1SH2 are sample hold circuits for storing the output of the encoder 1PSG respectively at the trailing end of the signal from the pulse generator 1PG and at the trailing end of the signal from the delay circuit 1DEL, said sample hold circuit 1SH1 being composed of a switch 1SW1 to be closed by the pulse from the pulse generator 1PG, a condenser 1C1 for storing the signal and an amplifier 1AMP1, while the sample hold circuit 1SH2 being composed of a switch 1SW2 to be closed by the output from the delay circuit 1DEL, a condenser 1C2 for storing the signal and an amplifier 1AMP2; and 1SUB is a subtractor receiving the signals from the amplifiers 1AMP1, 1AMP2 of the sample hold circuits 1SH1, 1SH2 and supplying the feedback signal to the error amplifier 1EAMP.

The function of the above-explained embodiment is as follows.

It is assumed that the motor 1M is maintained in rotation whereby the encoder 1PSG releases a signal as shown in FIG. 12a, of which the left-hand portion represents the wave form of the signal during acceleration from a speed lower than the instructed speed.

The output signal of the encoder 1PSG, of which frequency represents the displacing speed, is converted into binary signals by the voltage comparator 1WS. Also the pulse generator 1PG releases the signal as shown in FIG. 12c, whereby the output of the encoder 1PSG is sampled in the condenser 1C1 at the time T. FIG. 12e shows the signal obtained from the amplifier 1AMP1.

Successively the switch 1SW2 is activated by the signal of the pulse generator 1PG delayed by ΔT by the delay circuit 1DEL, whereby the output of the encoder 1PSG at the time T+ΔT is stored in the condenser 1C2 and the signal shown in FIG. 12F is obtained from the amplifier 1AMP2. Th subtractor 1SUB receives the outputs from the sample hold circuits 1SH1, 1SH2 and releases the difference signal g, which, as explained in the following, is an analog signal proportional to the frequency.

Said difference signal can be represented by the following equation:

$$g = A \sin W(T + \Delta T) - A \sin WT$$
$$= A (\sin WT \cos W\Delta T - \cos WT \sin W\Delta T - \sin WT)$$
$$= A \{\sin WT (\cos W\Delta T - 1) + \cos WT \sin W\Delta T\}$$

wherein A sin WT is the output of the encoder 1PSG, T is the time of trailing end of the output from the pulse generator 1PG, and ΔT is the delay time. Since sin WT≃0, cos WΔT≃1, cos TW≃1 and sin WΔT≃WΔT under the conditions WT≃2nπ and ΔT≃0, thus:

$$g \simeq AW\Delta T.$$

In this manner, if the output of the encoder is of a constant amplitude, the value of signal g is proportional to the frequency of the encoder and also to ΔT.

Consequently in the servo control, the feedback ratio of the speed component can be modified by changing the delay time ΔT of the pulse.

Figure 13:
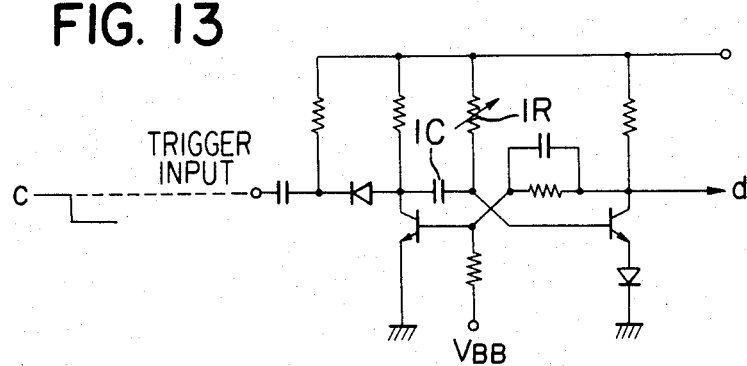
FIG. 13 is a diagram of a mono-stable circuit.

FIG. 13 shows an example of the delay circuit, in which the trailing end of the pulse is delayed by the period determined by a CR circuit rendered adjustable by a variable resistor 1R.

FIG. 14 shows another example of the delay circuit in which a predetermined initial value stored in a register 1REg is transferred by the signal from the pulse generator 1PG to a counter 1CNT. The content of said counter 1CNT is step reduced upon receipt of each clock pulse C from the oscillator 1OSC, and the eventually generated borrow signal is utilized as the signal for actuating the switch SW2.

It is therefore possible to arbitrarily adjust the period ΔT by selecting the initial value stored in the register 1REG with the keys in the keyboard 1K, and to effect the control by means of a microcomputer or digital circuits.

As explained in the foregoing the servo control system of the present invention allows an easy control with a single circuit of a fixed amplifying ratio through the adjustment of the amount of speed component, and, in case of the system utilizing the counter, the system allows unlimited adjustment through the change of register content and also enables the integration of the entire circuit.

In the following explained is another embodiment of the present invention particularly relating to a position servo control system, since the speed servo control system can be obtained by eliminating the position signal circuit from the position servo control system.

Figure 16:
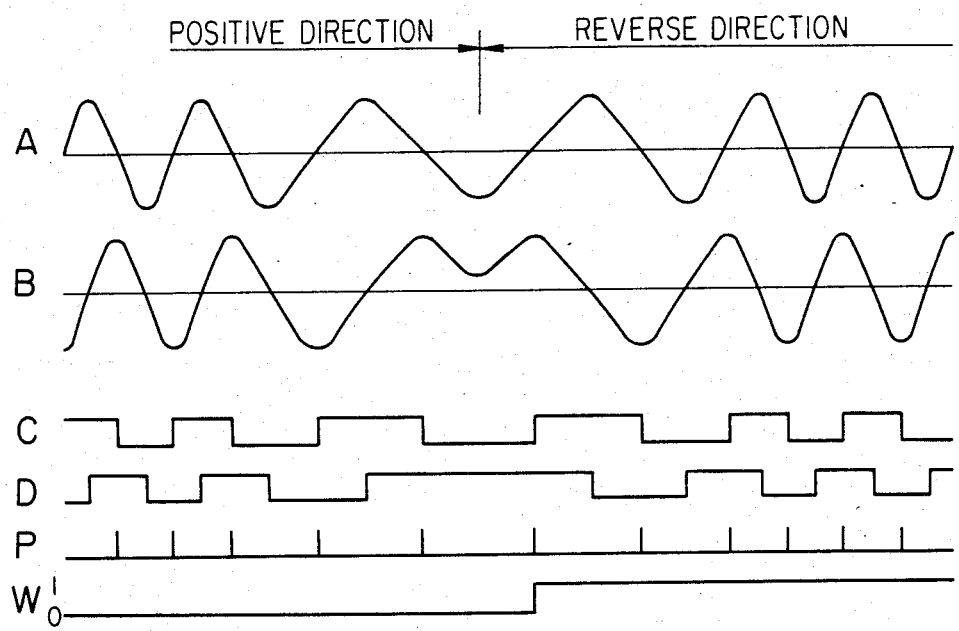
FIG. 16 is a wave-form chart.
Figure 17:
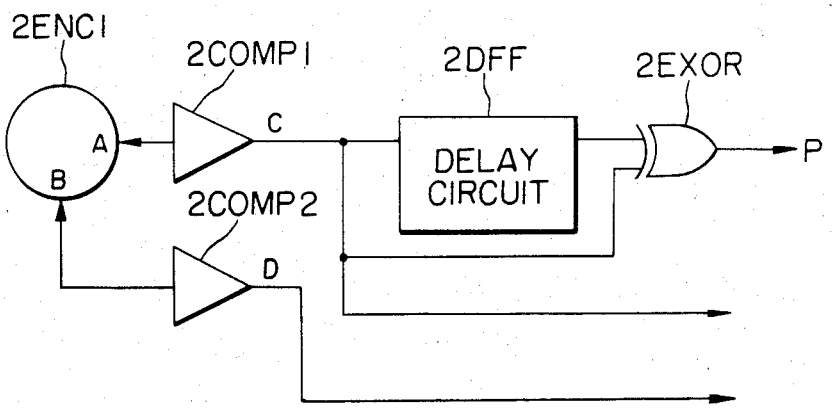
FIG. 17 is a block diagram showing the details of the pulse forming circuit shown in FIG. 15.

FIG. 15 is a block diagram of an embodiment of the servo control system of the present invention, in which:

2M2 is a drive source of which state, for example revolution, is detected by an increment type encoder 2ENC1 releasing an AC signal as shown in FIG. 16;

WF1 is a pulse forming circuit for converting the AC signals A, B of a phase difference of 90° from the encoder 2ENC1 into binary signals by means of voltage comparators 2COMP1, 2COMP2 shown in FIG. 17 and detecting the direction from the signal from said voltage comparators, i.e. forming a direction signal W by setting or resetting an unrepresented flip-flop in response to the level of signal D at the moment when the signal C is shifted from the level 0 to level 1;

P is a position signal obtained from an exclusive OR circuit 2EXOR receiving the signal C and said signal C obtained through a D-flip-flop DFF, whereby the position signal pulse P being obtained at the leading end and the trailing end of the signal C;

2CNT1 is a counter of which content is set to an initial value in response to the position instruction signal and is step increased or decreased upon receipt of the position pulse signal from the pulse forming circuit 2WF1 respectively when the direction signal from the pulse forming circuit 2WF1 is 1 or 0;

2CO is a pulse interval counting circuit comprising a standard time generator 2STG and a counter 2TCNT and measuring the interval of position pulses by the pulse signals from the standard time generator 2STG;

2ALU is an arithmetic unit for obtaining the speed signal as the reciprocal of the count of the pulse interval counting circuit 2CO;

2SUB is a subtractor for subtracting the content of the arithmetic unit 2ALu from the content of the counter 2CNT1;

2DA1 is a digital-analog converting circuit for converting the result obtained from said subtractor into an analog value; and 2AMP is an amplifier for driving the drive source 2M2.

The function of the above-explained embodiment is explained in the following.

Basically this embodiment is constructed to function so as to nullify the initial value set in the counter 2CNT1 by the position instruction signal. For the purpose of simplicity, the drive source 2M2 is assumed as a motor. When a positive initial value is set as the position instruction into the counter 2CNT1 while the drive source is stopped, the counter 2CNT1 does not receive the position pulse P and the speed signal is zero. Consequently the content of the counter 2CNT1 is transmitted through the subtractor 2SUB, converted into an analog value in the digital-analog converter 2DA1 and amplified in the amplifier 2AMP thereby to initiate the rotation of the drive source 2M2 in a certain direction. The state of said rotation, including the direction thereof, is detected by the increment type encoder 2ENC1 to activate the pulse forming circuit 2WF1, whereby the generated position pulses P changes (step decreases in this case) the content of the counter 2CNT1. At the same time the counter 2TCNT counts the pulses from the standard time generator 2STG to measure the interval of position pulses. The counter 2TCNT is cleared by the position pulse P and transfers the content to the arithmetic unit 2ALU which releases the speed signal by calculating the reciprocal of said content in real time.

Successively the position error signal which is the content of the counter 2CNT1 after subtraction by the position pulses P and said speed signal are processed in the subtractor 2SUB, of which result is converted by the digital-analog converter 2DA1 into an analog value and amplified by the amplifier 2AMP thereby driving the drive source 2M2 by a power corresponding to the output thereof. As will be apparent from the foregoing explanation, the power supplied to the drive source 2M2 gradually decreases from an initial value and approaches zero toward the target position, thus enabling smooth stop at the target position. In case the initial value of the counter 2CNT1 is negative, the content thereof is step increased while the sign of the speed is inverted by the moving direction, thus achieving the function similarly as explained above.

As explained in the foregoing, the present invention obtains the speed signal only with a delay required for calculating the reciprocal of the count representing the interval of the position pulses. If the reciprocal is obtained from a reciprocal table memory, it is rendered possible to obtain the instantaneous speed only with a delay required for the read-out of the memory and thus to improve the stability of the control system. Said memory may be composed either of a read-only memory or of a read-write memory in which case the data are stored in the memory before starting the control.

It will be apparent that, for an interval T of the position pulses and a standard time $\Delta T$, the count N of the counter is equal to the integer portion of $T/\Delta T$ or said integer portion minus one. Supposing that $T/\Delta T$ is sufficiently larger than 2 and representing the maximum natural number not exceeding A by [A], then:

$$N=[T/\Delta T]=T/\Delta T, \text{ because } T/\Delta T-[T/\Delta T]<2.$$

If the position pulses are generated on the encoder at a pitch a, the moving speed V can be represented by:

$$V=a/T=a/N\Delta T.$$

Thus:

$$bV=ab/N\Delta T$$

wherein b is the amplifying ratio of the speed signal in the servo feedback circuit. The critical deceleration point in the servo system, usually obtained by adjusting the amplifying ratio b, is obtained in this invention by modifying the value of $\Delta T$. This pulse interval modification is digitally achievable by providing a frequency dividing circuit in the standard time generating circuit and is therefore suitable for utilizing an integrated circuit.

The entire circuit of the present invention is suitable for realization as an integrated circuit, which will provide, in addition to compactization, reduced error and erroneous functions resulting from drift or noises in the amplifiers or in the frequency-voltage converting circuit, and improved stability against the effect of temperature.

Figures 18, 19:
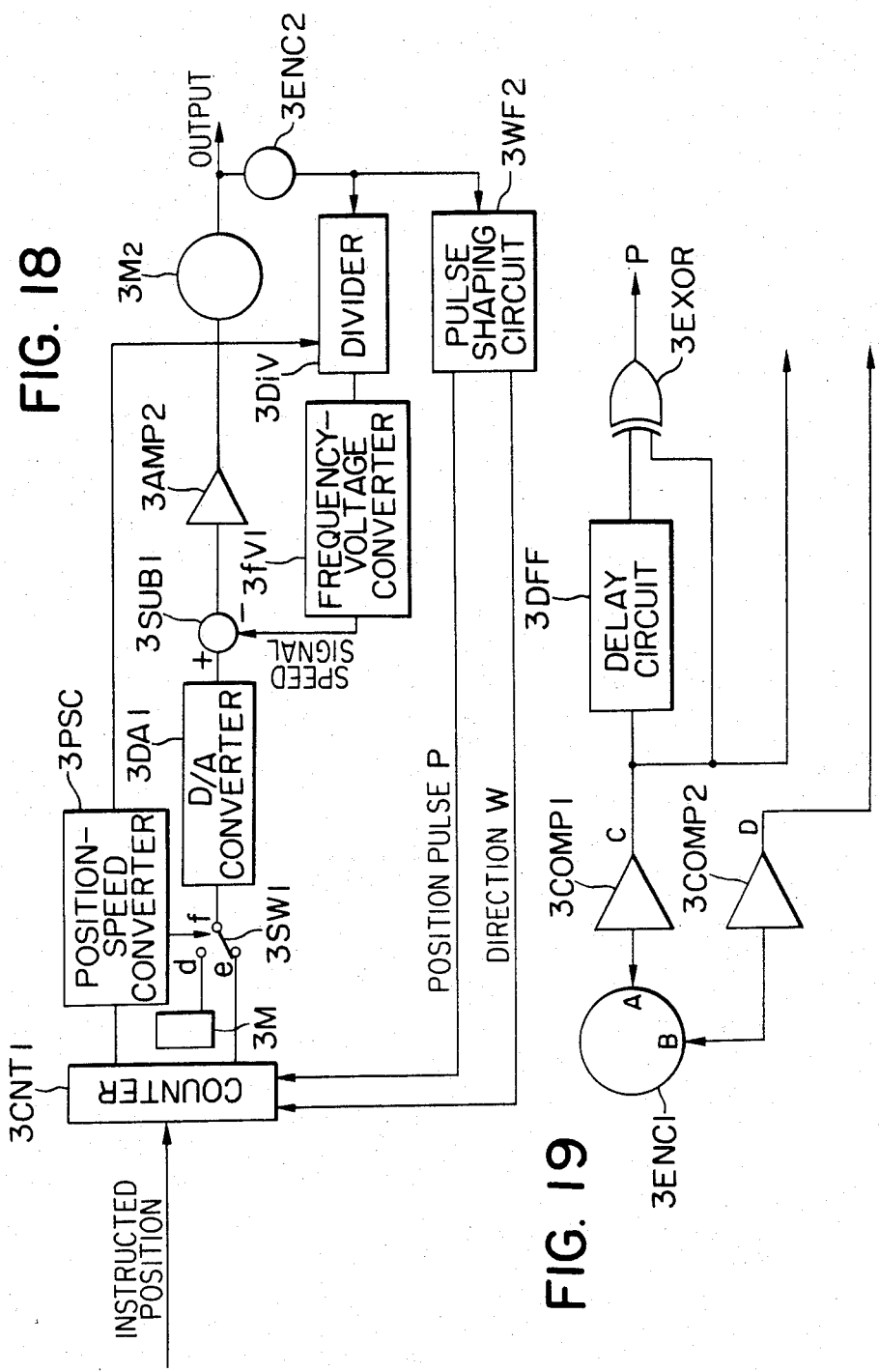
FIG. 18 is a block diagram of an embodiment of the present invention.
FIG. 19 is a diagram showing the details of the pulse forming circuit shown in FIG. 18.
Figure 20:
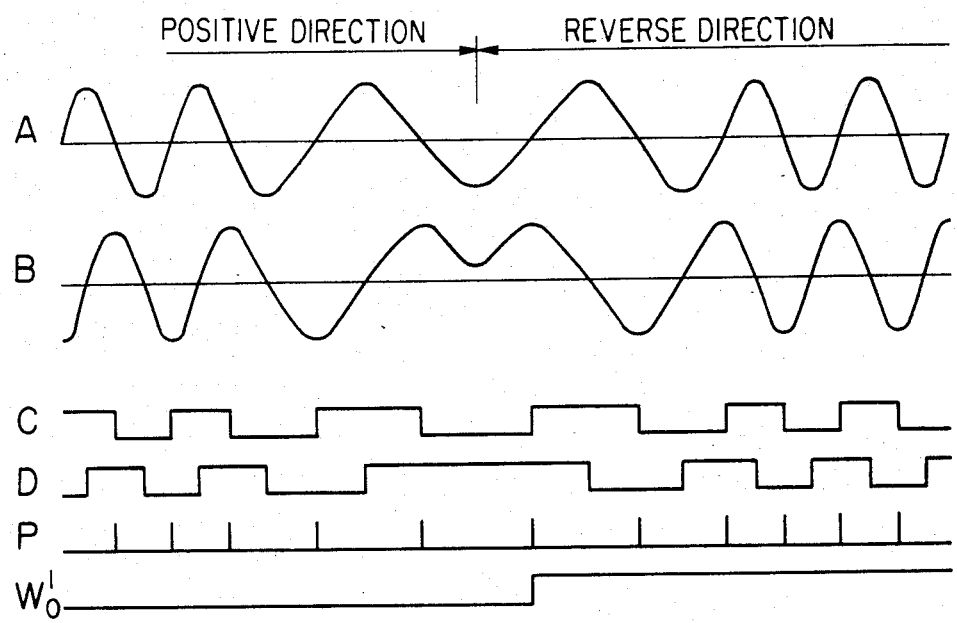
FIG. 20 is a wave-form chart.

FIG. 18 shows a block diagram of an embodiment of the speed servo control system according to the present invention, wherein:

3M2 is a drive source such as a motor;

3ENC2 is an increment type encoder for releasing, in response to the revolution of the drive source 3M2, signals A and B of a phase difference of 90° as shown in FIG. 20;

3WF2 is a pulse shaping circuit for converting the signals A, B into binary signals by voltage comparators 3COMP1, 3COMP2 shown in FIG. 19 to release the signals C, D shown in FIG. 20, said signal C being supplied directly and through a delay circuit 3DFF to an exclusive OR gate 3EXOR to obtain the position signal P, and the direction signal W being obtained by setting or resetting an unrepresented flip-flop according to the level "1" or "0" of the signal D at the leading end of the signal C;

3CNT1 is a counter of which content is set to an initial value in response to the instruction signal and is step increased or decreased upon each receipt of the position pulse P, respectively when the direction signal W is at the level "1" or "0";

3PSC is a position-speed converter or converting circuit for actuating a switch 3SW1 to transmit the content thereof or the content of a memory M to the successive stage and changing the dividing circuit 3DiV both according to the content of the counter 3CNT1;

3DA1 is a digital-analog converter for converting a received digital value into an analog value;

3DiV is a dividing circuit with a variable dividing ratio of 1/1, $\frac{1}{2}$, $\frac{1}{3}$, $\frac{1}{4}$, 1/5, 1/6, ... in response to the signal from the position-speed converting circuit, such dividing circuit being composed, for example for a variable dividing ratio from 1/1 to 1/16, of a 4-bit memory and a carry bit wherein the dividing signal being obtained by setting an initial value 0–15 into said 4-bit memory directly before the frequency division, step increasing the content of said 4-bit memory by the signal from the encoder and again setting said initial value into the 4-bit memory upon receipt of the signal "1" by the carry bit, wherein said initial value being determined by the signal from the position-speed converting circuit 3PSC;

3fvl is a frequency-voltage converter for releasing a voltage proportional to the frequency obtained through the dividing circuit DiV;

3SUB1 is a subtractor for obtaining the difference between the output from the digital-analog converter 3DA1 and the output from said frequency-voltage converter 3fvl; and 3AMP2 is an amplifier for amplifying the output from the subtractor 3SUB1 to supply the power to the drive source 3M2.

Figure 21:
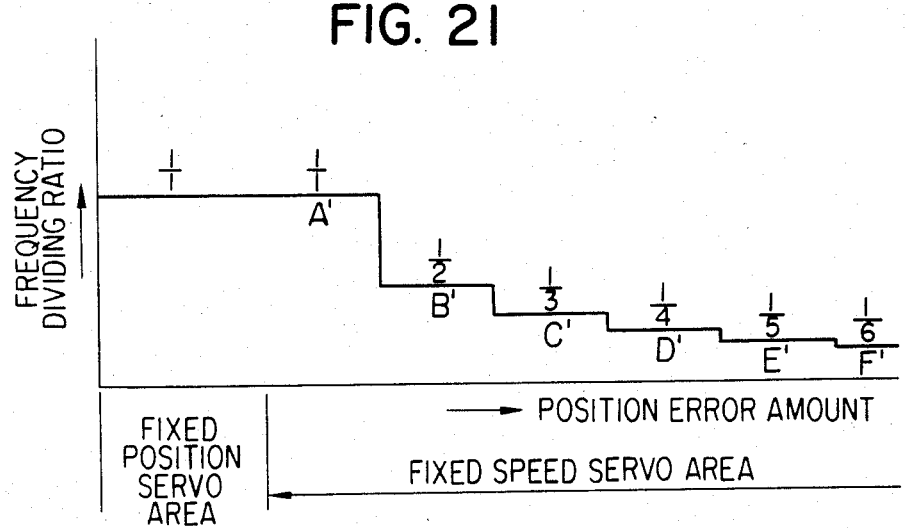
FIG. 21 is a chart showing the frequency dividing ratio instructed from the position-speed converting circuit to the frequency dividing circuit in relation to the amount of positional error.

The function of the above-explained embodiment will be explained as follows in connection with FIG. 21.

When the content of the counter 3CNT1 in FIG. 18 is not significantly changed from the initially set value, the position-speed converting circuit 3PSC actuates the switch 3SW1 so as to form a circuit between the points d and f.

Consequently a signal based on the value stored in the memory 3M is supplied to the digital-analog converting circuit 3DA1, thus supplying a large power to the drive source 3M2 to perform the constant-speed control.

However, when the content of the counter 3CNT1 becomes smaller, the position-speed converting circuit 3PSC correspondingly reduces the dividing ratio of the dividing circuit 3DiV, thus increasing the speed signal supplied to the subtractor 3SUB1. The values stored in the memory 3M are determined in a range not saturating the amplifier 3AMP2 for foreseeable displacing speeds. Said value is supplied through the switch, converted into an analog voltage by the digital-analog converting circuit 3DA1 and supplied to the subtractor 3SUB1. In the area A', the pulses from the encoder 3ENC2 are converted, without prior frequency change, into the speed signal by the frequency-voltage converting circuit 3fvl, and the constant-speed servo control is achieved with reference to the above-mentioned constant value. In the area B', the pulses from the encoder 3ENC2 are divided into ½ by the position-speed converting circuit 3PSC, whereby the speed signal obtained from the frequency-voltage converting circuit 3fvl becomes ½ for a same speed as in the area A'. Stated inversely, the constant speed reached in the area B with respect to a constant value obtained from the memory M is twice as large as that reached in the area A. In this manner a variable-speed servo control is achieved with a triple speed in the area C' and a four times speed in the area D'.

As the content of the counter 3CNT1 is reduced at a position close to the target, the position-speed converting circuit 3PSC correspondingly actuates the switch 3SW1 to make the connection e-f. As the dividing ratio of the dividing circuit 3DiV is set at 1:1 at this state by the position-speed converting circuit 3PSC, the pulses from the encoder 3ENC2 are directly converted into the speed signal by the frequency-voltage converting circuit 3fvl to perform the fixed position servo control with reference to the content of the counter 3CNT1, thus rapidly stopping the drive source at the target position. In case of starting from a standstill state, an improved starting characteristic can be obtained by a constant voltage applied to the drive source 3M2, since the speed signal is zero in this state. Although the dividing ratios of the dividing circuit 3DiV are taken as 1/1, ½, ⅓, ¼, ... in the foregoing explanation, it is naturally possible to utilize another series of dividing ratios corresponding to the suitable speeds desired for different positional errors.

As explained in the foregoing, the present embodiment is featured by a constant voltage applied at the start from the stopped state, whereby the time required to reach the instructed speed is significantly reduced.

Figure 22:
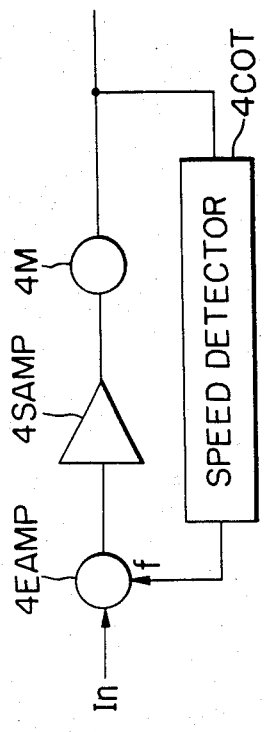
FIG. 22 is a block diagram showing the speed detecting system of the present invention.

FIG. 22 shows an embodiment of the speed detecting system according to the present invention, wherein:
4EAMP is an error amplifier giving the difference of an instruction signal in and a feedback signal f;
4SAMP is a servo amplifier for amplifying the output of the error amplifier 4EAMP to drive a motor 4M; and
4COT is a speed detecting circuit for detecting the revolution of the motor 4M and feeds the detected signal back to the error amplifier 4EAMP.

Figure 23:
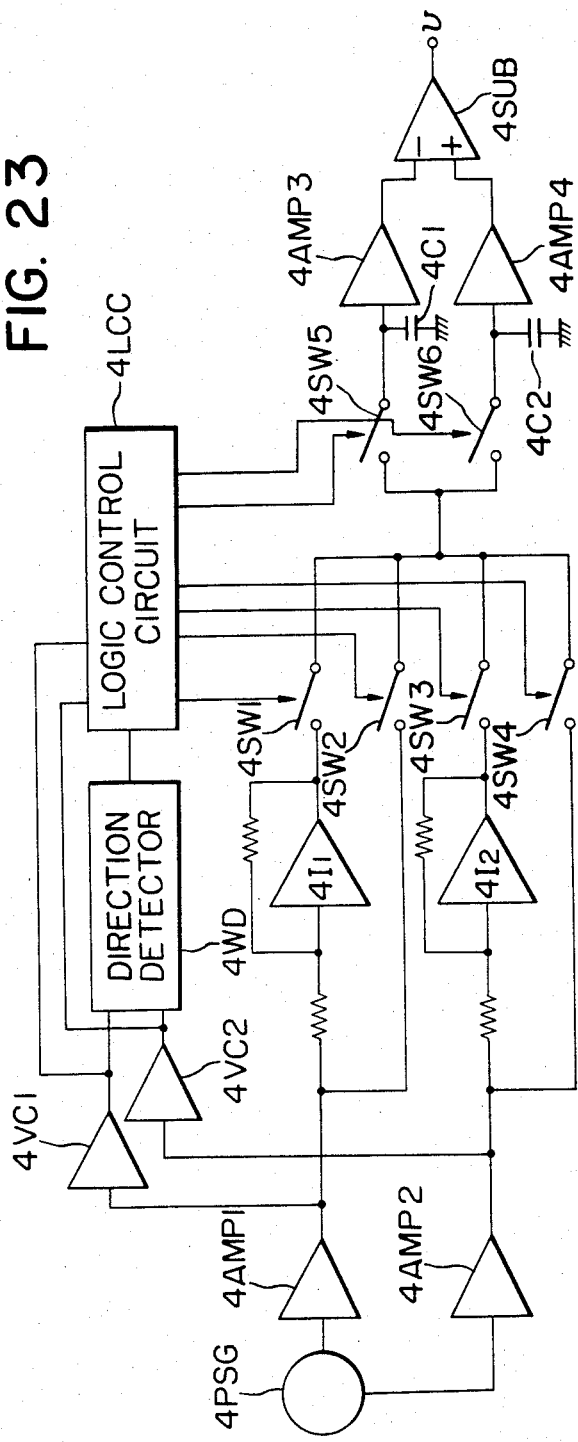
FIG. 23 is a block diagram of the speed detecting circuit shown in FIG. 22.
Figure 25:
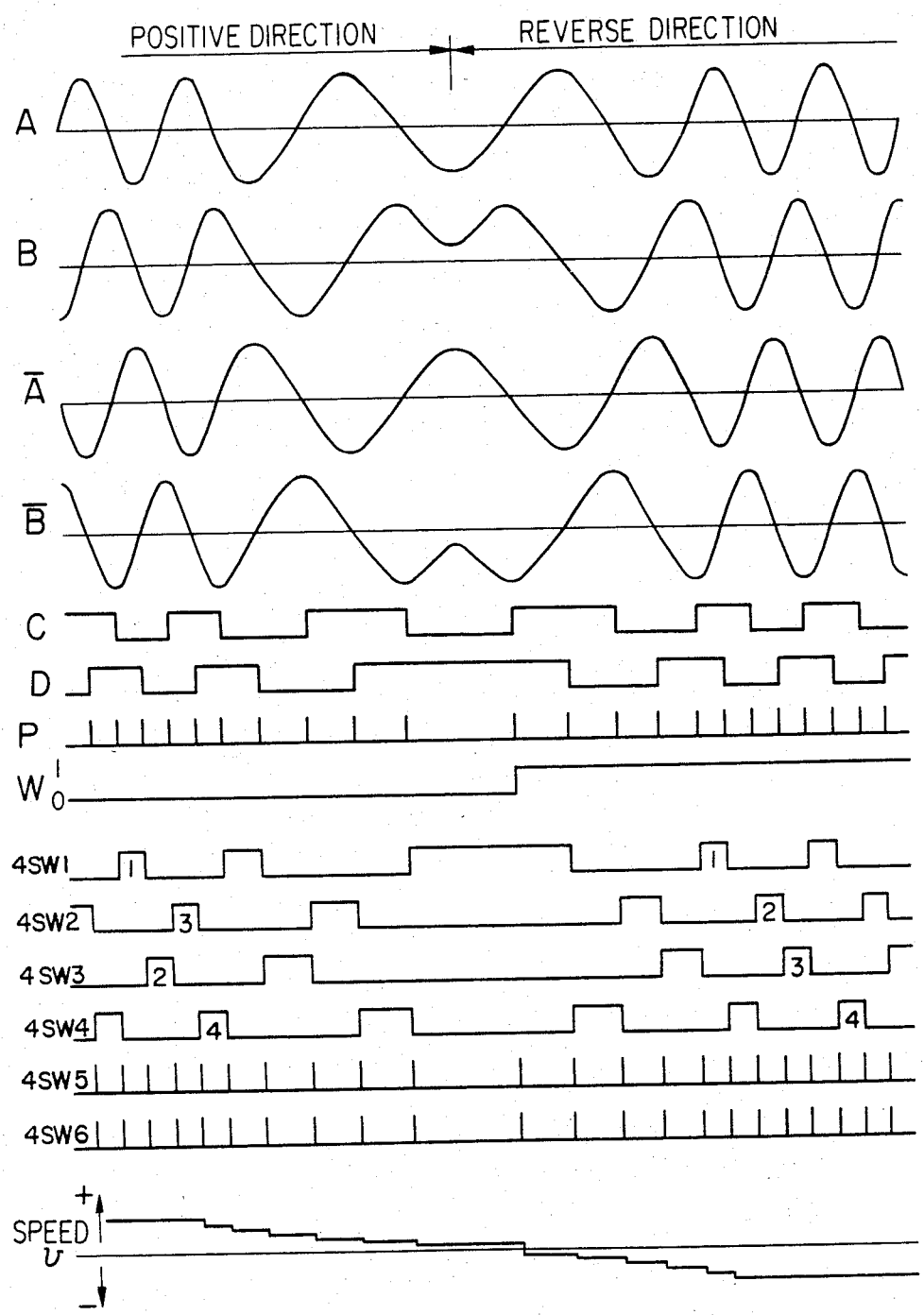
FIG. 25 is a wave-form chart.

FIG. 23 is a circuit diagram of the speed detecting circuit 4COT, wherein:
4PSG is an encoder for generating signals A, B of a phase difference of 90° as shown in FIG. 25 in response to the revolution of the motor 4M;
4AMP1, 4AMP2 are amplifiers for amplifying said signals of a mutual phase difference of 90° from the encoder 4PSG;
4VC1, 4VC2 are voltage comparators for generating an output signal "1" or "0", respectively, for an input voltage larger or smaller than zero as represented by the curves C and D in FIG. 25;

4WD is a direction detecting circuit for detecting the displacing direction by the delay or advancement between two signals A and B, i.e. by the output of a flip-flop set or reset corresponding to the levels of the signal D at the moment when the signal C is shifted from the level "0" to "1"; and
4LCC is a logic control circuit for generating the switch operating signals and position pulse signals P in response to the outputs of voltage comparators 4VC1, 4VC2 and the direction signal W from the direction detecting circuit 4WD.

Figure 24:
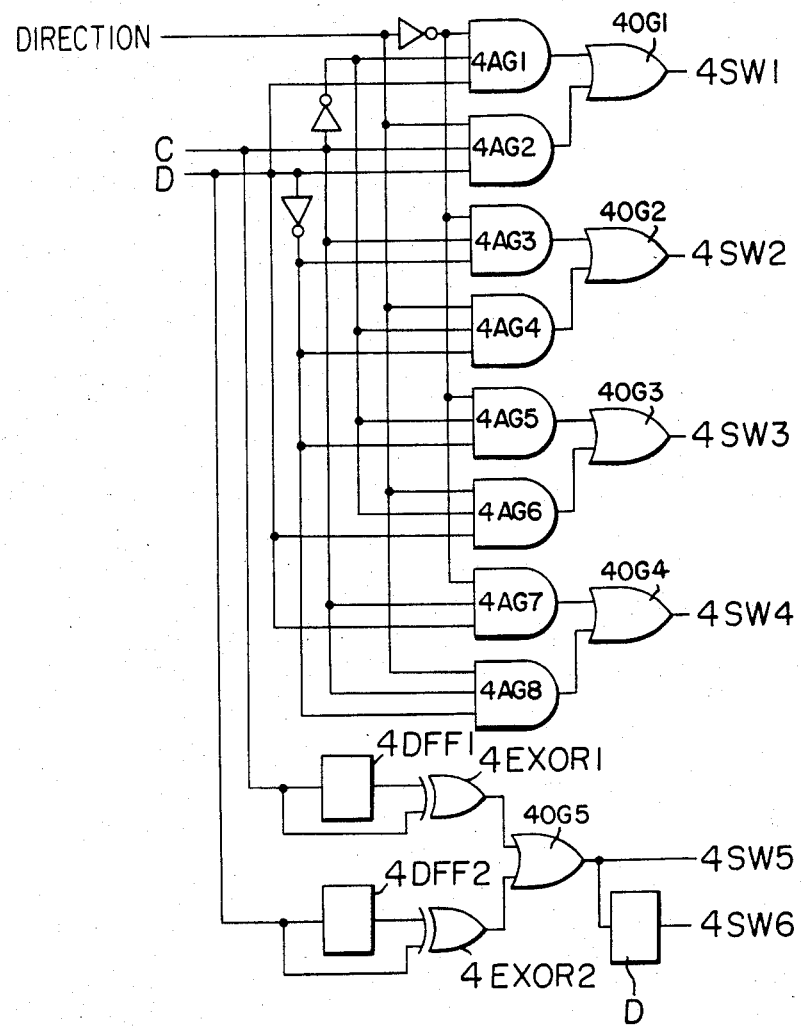
FIG. 24 is a block diagram of the logic control circuit.

FIG. 24 shows the principal portion of said logic control circuit 4LCC, wherein:
4AG1 to 4AG8 are AND gates connected according to the following logic table:

|  | $\overline{\text{direction}}$ | direction |
| --- | --- | --- |
| 4SW1 | $\overline{CD}$ | $CD$ |
| 4SW2 | $C\overline{D}$ | $\overline{CD}$ |
| 4SW3 | $\overline{CD}$ | $\overline{CD}$ |
| 4SW4 | $CD$ | $C\overline{D}$ |

4OG1 to 4OG4 are OR gates respectively receiving the outputs of the AND gates 4AG1 and 4AG2; 4AG3 and 4AG4; 4AG5 and 4AG6; and 4AG7 and 4AG8 and respectively operating the switches 4SW1 to 4SW4 to be explained later;
4DFF1 and 4DFF2 are D type flip-flops; and
4EXOR1 and 4EXOR2 are exclusive OR gates of which outputs are supplied to an OR gate 4OG5, of which output signal operates a switch 4SW5 and through a delay circuit 4D a switch 4SW6.

Again referring to the circuit shown in FIG. 23:
I1 is an inverter for inverting the output of the amplifier 4AMP1, while I2 is another inverter for inverting the output of the amplifier 4AMP2;
4SW1 to 4SW4 are switches controlled by the outputs of said logic control circuit 4LCC for transmitting the outputs respectively of the inverter I1, amplifier 4AMP1, inverter I2, and amplifier 4AMP2;
4SW5 and 4SW6 are switches controlled by the signals from the logic control circuit 4LCC shown in FIG. 24 for respectively storing the input voltages in the condensers 4C1, 4C2; and
4AMP3 and 4AMP4 are amplifiers for amplifying the voltage stored in the condensers 4C1 4C2 and supplying thus amplified voltages to a subtractor 4SUB; whereby sample hold circuits are formed by the switch 4SW5, condenser 4C1 and amplifier 4AMP3, and the switch 4SW6, condenser 4C2 and amplifier 4AMP4, and the output of said subtractor 4SUB is supplied as a feedback signal to the error amplifier 4EAMP.

The function of the above-explained embodiment will be explained in the following, with respect to a process from deceleration of a displacement or revolution in a positive direction to acceleration of a displacement or revolution in a negative direction.

In response to the revolution of the motor 4M, the encoder 4PSG supplies the signals shown in FIG. 25A and B respectively to the amplifiers 4AMP1, 4AMP2 of which outputs are supplied to the voltage comparators 4VC1, 4VC2, of which outputs, shown in FIG. 25C and D, are supplied together with the output from the direction detecting circuit 4WD to the logic control circuit LCC.

The switches 4SW1–4SW4 are controlled by the signals C, D and the direction signal to release the signals $\overline{A}$, A, $\overline{B}$ and B in the increasing area or in the decreasing area respectively when the direction signal is at the low level "0" or high level "1". The signal from the switch 4SW5 is same as the position signal pulse P and samples the reference level for speed detection, while the signal from the switch 4SW6 is delayed with respect to the signal from the switch 4SW5 and samples the signals $\overline{A}$, A, $\overline{B}$ and B. The speed signal is obtained by the subtraction of these two sampled signals. The speed signal is obtained by approximately differentiating the AC wave forms of the signals $\overline{A}$, A, $\overline{B}$ and B at the time of the position pulse P.

As explained in the foregoing, the present embodiment provides the speed signal with a sign corresponding to the displacing direction in the same analog circuit by displacing the signals of the switches 4SW1, 4SW2, 4SW3 and 4SW4 by 180° with respect to the signals $\overline{A}$, A, $\overline{B}$ and B according to the direction signal, and thus enables to obtain an instantaneous speed including the direction from the frequency of the output from the encoder.

What is claimed is:

1. A speed servo control apparatus, comprising:
    signal generating means for providing a pulse train of a frequency proportional to a speed of a displacing body;
    frequency dividing means for dividing the frequency of said pulse train;
    changing means for changing the dividing ratio of said frequency dividing means; and
    means for comparing output signals from said frequency dividing means with a predetermined value and for generating speed control signals.

2. A speed servo control apparatus according to the claim 1, wherein said frequency dividing means includes a counter.

3. A speed servo control apparatus according to the claim 2, wherein said counter is of a type that initial values are selectively settable.

4. A speed servo control apparatus according to the claim 1, wherein said signal generating means is a rotary encoder.

5. A speed servo control apparatus according to claim 1, further comprising means for converting output signals divided by said frequency dividing means to analog values.

6. A speed control apparatus, comprising:
    signal generating means for generating a signal of a frequency proportional to a speed of a displacing body;
    sampling means for conducting a first sampling of said signal from said signal generating means at a predetermined time and a second sampling thereof a predetermined period after said predetermined time;
    means for comparing a signal which results from said first sampling with a signal which results from said second sampling, and for generating a signal representative of their difference; and
    means for controlling the speed of the displacing body in accordance with said signal representative of the difference.

7. A speed control apparatus according to claim 6, further comprising detecting means for detecting a displacing direction of the displacing body.

8. A speed control apparatus according to claim 7, further comprising means for providing the difference with a polarity according to an output of said detecting means.

9. A speed control apparatus according to claim 6, further comprising means for storing a signal which results from said first sampling.

10. A speed control system, comprising:
    first signal generating means for generating a first signal of a frequency proportional to the speed of movement of a displaceable body movable in more than one direction;
    second signal generating means for generating a second signal of a frequency proportional to the speed of movement of the displaceable body, said second signal having a phase difference with respect to said first signal;
    detecting means connected to said first and second signal generating means for detecting the displacement direction of the displaceable body from said first and second signals; and
    means for controlling the direction of movement of the displaceable body in accordance with the displacement direction detection by said detecting means.

11. A speed control system according to claim 8, further comprising means connected to said controlling means for amplifying an error in the speed of movement of the displaceable body.

12. A speed control system, comprising:
    first signal generating means for generating a first signal of a frequency proportional to the speed of movement of a displaceable body;
    second signal generating means for generating a second signal of a frequency proportional to the speed of movement of the displaceable body, said second signal having a phase difference with respect to said first signal;
    detecting means connected to said first and second signal generating means for detecting the displacement direction of the displaceable body from said first and second signals; and
    controlling means for controlling the speed of movement of the displaceable body in accordance with the displacement detection by said detecting means, wherein said controlling means includes inverter means for changing the polarity of said first and second signals of said first and second signal generating means.

13. A speed control system according to claim 12, wherein said controlling means includes hold means for holding one of said first and second signals after its polarity has been changed by said inverter means.

14. A speed control system according to claim 13, wherein said controlling means includes a circuit for generating a signal for effecting the speed of movement in response to a signal formed from the signal held by said hold means.

* * * * *

UNITED STATES PATENT AND TRADEMARK OFFICE
CERTIFICATE OF CORRECTION

PATENT NO. : 4,511,830

DATED : April 16, 1985

INVENTOR(S) : YASUAKI YAMADA, ET AL.

It is certified that error appears in the above-identified patent and that said Letters Patent is hereby corrected as shown below:

Column 7, line 9, change "Th" to --The--;
        line 26, change "cos TW$\simeq$1" to --cos WT$\simeq$1--.

Column 10, line 30, insert --3PSC-- after "converting circuit";
         line 45, insert --3-- before "Div".

Column 14, line 32, change "claim 8" to --claim 12--.

Signed and Sealed this

Eleventh Day of March 1986

[SEAL]

Attest:

DONALD J. QUIGG

Attesting Officer

Commissioner of Patents and Trademarks